W. B. JOHNS.
Harvester Rake.
No. 72,644.
2 Sheets—Sheet 2.
Patented Dec. 24, 1867.
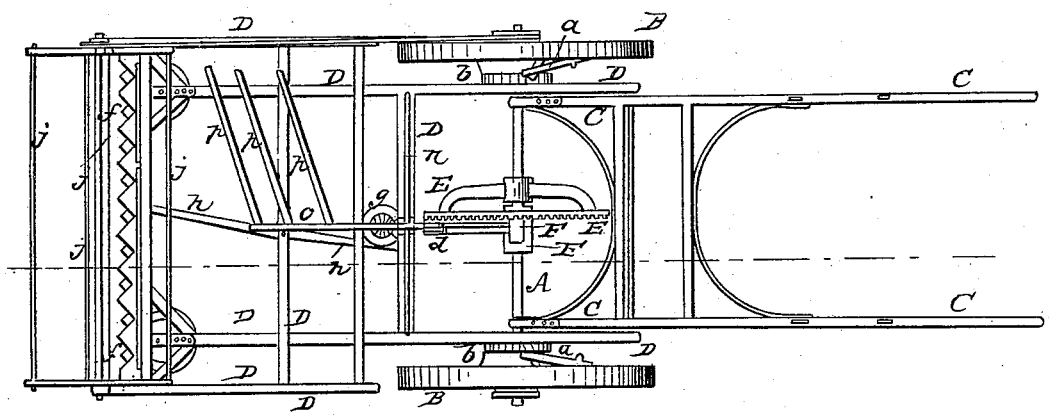
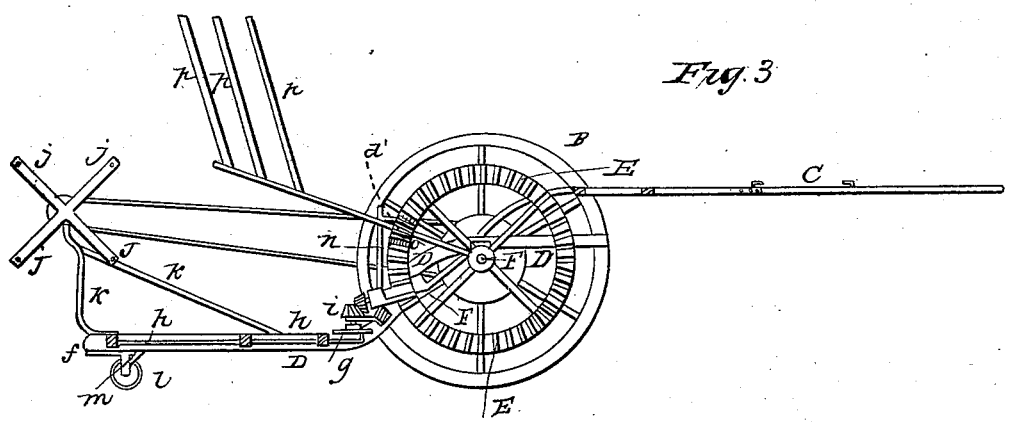

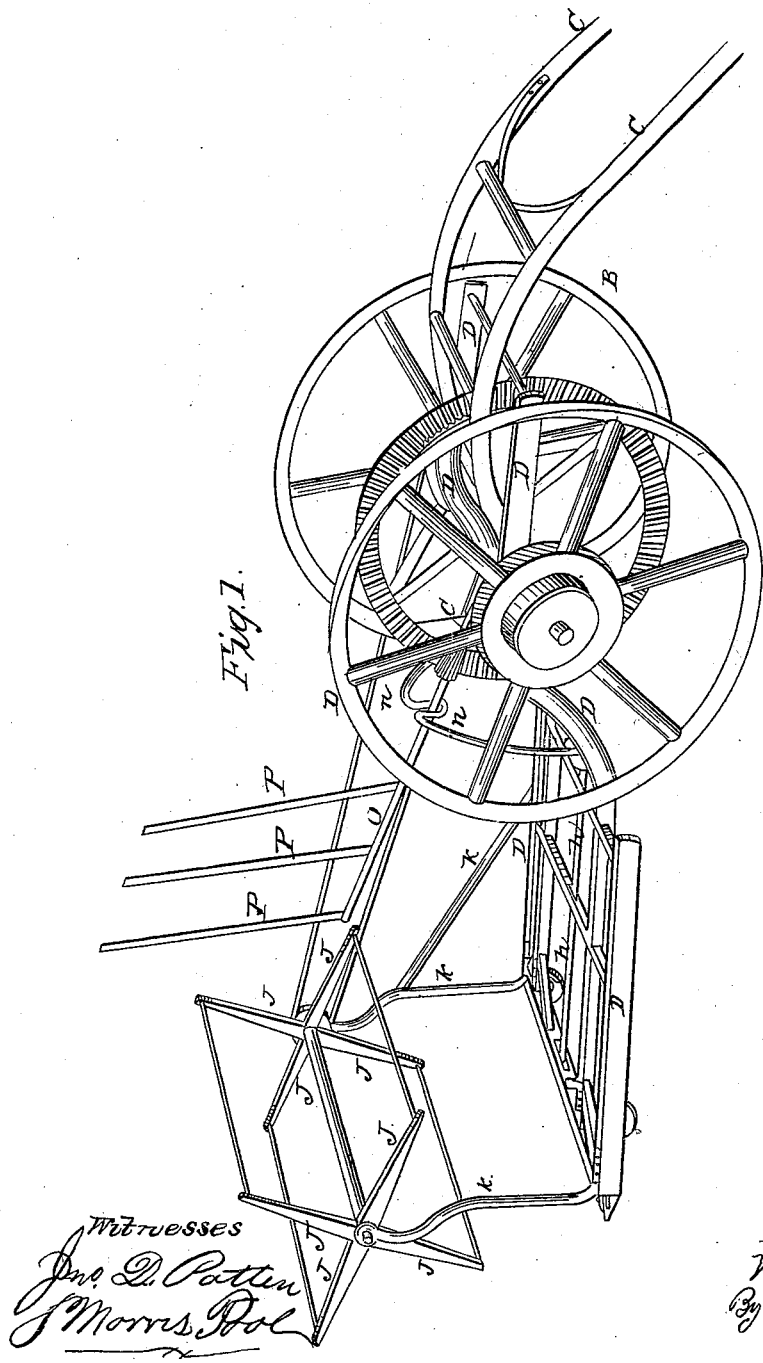

UNITED STATES PATENT OFFICE.

WILLIAM B. JOHNS, OF CUMBERLAND, MARYLAND.

IMPROVEMENT IN HARVESTER-RAKES.

Specification forming part of Letters Patent No. 72,644, dated December 24, 1867.

*To all whom it may concern:*

Be it known that I, WILLIAM B. JOHNS, of Cumberland, in the county of Alleghany and State of Maryland, have invented certain new and useful Improvements in Grain and Grass Harvesters; and I do hereby declare the following to be a full, clear, and exact description of the construction and operation of the same, reference being had to the accompanying drawings, making a part of this specification, in which—

Figure 1 represents a perspective view of the machine. Fig. 2 represents a top plan, and Fig. 3 represents a longitudinal vertical section through the machine.

Similar letters of reference, where they occur in the separate figures, denote like parts of the machine in all of the drawings.

My invention relates to that class of machines in which the carrying-wheels and cutting and raking apparatus are propelled in front of the team; and the invention consists, first, in driving the cutters and the rake from the same bevel-gear, which is centrally placed and revolved on the main axle, by which means very little gearing is required, and the machine simply and cheaply made.

The invention further consists in combining with a reel for gathering in the grain, so as to fall when cut upon the grain table or platform, a rake revolving at right angles to the direction in which the machine moves, and furnished with spring or yielding teeth, so that it may sweep off and deliver the cut grain at the side of the machine.

To enable others skilled in the art to make and use my invention, I will proceed to describe the same with reference to the drawings.

A represents the main axle, upon which is placed, one at each end thereof, the main carrying and driving wheels B B, which, by means of pawls $a$ and ratchets $b$, are fast and loose upon said axle, as the case may be. The shafts C are hinged to the axle A and project rearward, so that the team shall travel behind the machine and push or propel it in front. The main frame D of the machine is also hinged to the axle A, and projects forward, and also droops, so that the portion on which the grain-table is placed and the cutters are arranged shall be near to the surface of the ground, while the rear of said frame may pass over the top of the axle, the side timbers of said main frame being curved, as shown in the drawings, to admit of this drooping form at the front and rising form at the rear thereof.

At or near the center of the main axle A is placed a crown bevel-gear, E, by which the cutters and rake are both driven. The bevel-wheel is made crowning, so that its hub may be at one side of the center of the main axle, while its teeth or cogs may be at or over said center, and the moving of the hub of the gear beyond or to one side of the center admits of connecting a plate or bar, F, to the axle, and to the main frame in a central position on the axle, which plate or bar supports the shaft $c$, that carries the bevel-pinions $d\ e$, for giving motion to the cutters $f$ through a crank-wheel, $g$, and a vibrating bar, $h$, worked by said crank-wheel, the crank-wheel being revolved by a bevel-gear, $i$, driven by the one of the bevel-pinions, $e$, on the shaft $c$.

The reel $j$ is hung in reel-posts $k$, arranged at the front corners of the main frame, and is driven by an endless belt, running around a pulley on one of the drive-wheels B and a pulley upon the end of the reel-shaft.

When cutting grain, the front end of the machine may be carried upon caster-wheels $l$, which are hung to a pivoted frame, $m$, so that they may have a swiveling motion on their pivots in addition to the turning motion upon their journals in said frame.

When the machine is used for cutting grass, the caster-wheels may be set far back on the main frame, so as to let the cutters close down to the ground; or the casters may be removed entirely, and shoes put on in their places, upon which the cutting portion of the machine may be carried low down.

Upon an arched piece, $n$, and in the plate F, near to the main axle A, there is supported a rake stale or shaft, $o$, upon which a bevel-pinion, $d'$, is placed, and which gears into the main bevel-gear E, and thus the rake stale or shaft is revolved.

On the projecting end of the rake stale or shaft are spring or yielding fingers or teeth $p$, which sweep the cut grain from the platform or grain-table, and deliver it upon the ground at the side of the main frame. That these fingers *p* may reach and act from side to side of the platform, they are elastic or yielding, so as to accommodate themselves to the width of the platform, while they revolve in a circle.

As represented in the drawings, the rake would have a continuous motion; but I design using a clutch, so that the operator, riding upon the horse, or on the machine, or walking alongside of it, may throw the rake into and out of action at pleasure, or as the size of the gavels may require.

The cutters are thrown out of action by raising the pawls *a* from their ratchets, which allows the wheels B to turn independent of the axle and the latter to remain passive. A clutch, however, may be used in connection with the crown-wheel E, to throw it out of connection with the pinions it drives, and which is more readily operated than the pawls.

Having thus fully described my invention, what I claim therein as new, and desire to secure by Letters Patent, is—

1. The bevel-gear E, centrally placed on the main axle, and when used directly for driving the cutters and the rake both, substantially as described.

2. I also claim, in combination with the cutters and reel for laying the grain upon the platform or grain-table, a rake revolving at right angles to the forward movement of the machine, for raking off and delivering the grain in gavels at the side of the machine, as set forth and described.

WILLIAM B. JOHNS.

Witnesses:
A. B. STOUGHTON,
EDM. F. BROWN.